United States Patent
Itakura

(10) Patent No.: US 10,134,321 B2
(45) Date of Patent: Nov. 20, 2018

(54) DISPLAY DEVICE AND DISPLAY METHOD

(71) Applicant: NEC Display Solutions, Ltd., Tokyo (JP)

(72) Inventor: Naoki Itakura, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 15/543,604

(22) PCT Filed: Jan. 28, 2015

(86) PCT No.: PCT/JP2015/052297
§ 371 (c)(1),
(2) Date: Jul. 14, 2017

(87) PCT Pub. No.: WO2016/121025
PCT Pub. Date: Aug. 4, 2016

(65) Prior Publication Data
US 2018/0005560 A1  Jan. 4, 2018

(51) Int. Cl.
*G09G 3/20* (2006.01)
*H04N 1/60* (2006.01)

(52) U.S. Cl.
CPC ......... *G09G 3/2003* (2013.01); *H04N 1/6094* (2013.01); *G09G 2320/0242* (2013.01);
(Continued)

(58) Field of Classification Search
CPC ......... G09G 3/2003; G09G 2320/0666; G09G 2320/0242; G09G 2360/144; G09G 2360/145; H04N 1/6094
See application file for complete search history.

(56) References Cited

U.S. PATENT DOCUMENTS 5,956,015 A * 9/1999 Hino ................. G09G 5/02
345/600
6,567,543 B1* 5/2003 Shiraiwa ............ H04N 1/6088
348/E9.052

(Continued)

FOREIGN PATENT DOCUMENTS

JP    H 07-105375 A    4/1995
JP    H 10-173944 A    6/1998
(Continued)

OTHER PUBLICATIONS

International Search Report (ISR) (PCT Form PCT/ISA/210), in PCT/JP2015/052297, dated Apr. 21, 2015.

*Primary Examiner* — Priyank Shah
(74) *Attorney, Agent, or Firm* — McGinn IP Law Group, PLLC.

(57) ABSTRACT

A display device includes a display panel, a driver, a detector, and an acquisition part. The driver drives the display panel based on a video signal. The detector obtains a first detection value by detecting reflective light from reflective media, which occurs when ambient light is irradiated to reflective media, while obtaining a second detection value by detecting reflective light from reflective media, which occurs when the display panel irradiates its display light to reflective media. The driver corrects a drive value for the display panel such that the second detection value approaches the first detection value or such that the chromaticity represented by the second detection value approaches the chromaticity represented by the first detection value, and therefore the acquisition part acquires information concerning the color temperature of ambient light based on the corrected drive value.

12 Claims, 7 Drawing Sheets

(52) U.S. Cl.
CPC ............ *G09G 2320/0666* (2013.01); *G09G 2360/144* (2013.01); *G09G 2360/145* (2013.01)

(56) References Cited

U.S. PATENT DOCUMENTS

| | | | |
|---|---|---|---|
| 9,875,724 B2* | 1/2018 | Gao | G09G 5/02 |
| 2002/0057282 A1* | 5/2002 | Yoshida | G09G 1/165 |
| | | | 345/698 |
| 2010/0020117 A1* | 1/2010 | Tanizoe | G09G 5/005 |
| | | | 345/690 |
| 2014/0285477 A1* | 9/2014 | Cho | G09G 3/2003 |
| | | | 345/207 |

FOREIGN PATENT DOCUMENTS

| | | |
|---|---|---|
| JP | 2006-349835 A | 12/2006 |
| WO | WO 2011/039813 A1 | 4/2011 |

* cited by examiner

DISPLAY DEVICE AND DISPLAY METHOD

TECHNICAL FIELD

The present invention relates to a display device and a display method.

BACKGROUND ART

Recently, color management for managing displayed colors of printing materials and monitors has been spread widely. The ICC (International Color Consortium) proposed color management using "profile formats for production and interpretation of color data independent from available computer system" (hereinafter, referred to as ICC profiles). ICC profiles are provided for each type of printing paper based on the specified color temperature for each light source (generally, 5,000 K (kelvin)), wherein ICC profiles may specify information concerning settings of color spaces and information concerning conversion between profiles. Various devices such as printers and monitors have their unique ICC profiles, and therefore they may implement operating systems and application programs to set color spaces using ICC profiles so as to share color information among various devices while maintaining tints for images.

Before printing images on printing papers with a printer, the printer may request each user to confirm tints of images to be printed on printing papers (i.e. images on printing materials) with a monitor in advance. A print emulator is known as a tool implementing a method for reproducing tints of images on printing materials with a monitor. Even when the print emulator is used to properly reproduce tints of images on printing materials with a monitor, it is necessary to adjust white points on a monitor to white points on each printing paper.

The white color of printing papers may be affected by both reflection characteristics of printing papers and color-temperature characteristics of light sources emitting ambient light. The most generally-known light sources such as fluorescent lights may suffer from dispersions in color temperatures, and therefore actual color temperatures of light sources may not match color temperatures (e.g. 5,000 K) specified by ICC profiles. For this reason, white points on the same type of printing papers may be varied depending on light sources, and therefore white points on printing papers may not match white points on a monitor specified by ICC profiles. In this case, the print emulator may not function properly.

To properly reproduce tints of images on printing materials with a monitor under the aforementioned circumstances, it is necessary to adjust white points on a monitor specified by ICC profiles to white points on printing papers under an actual light source. For this reason, it is necessary to obtain information concerning the actual color temperature of a light source, and therefore it is necessary to correct ICC profiles by recalculating the color space of a monitor based on the information concerning the color temperature. In this case, for example, it is possible to obtain the information concerning the color temperature of a light source by use of an illumination sensor for adjusting luminance, which is installed in a monitor.

CITATION LIST

Patent Literature

Patent Literature 1: Japanese Patent Application Publication No. H07-105375

SUMMARY OF INVENTION

Technical Problem

Generally speaking, however, sensors suffer from errors in detection. In addition, detected values of sensors will be changed due to degradation over time. For this reason, it is difficult to directly read color temperatures of light sources using sensors. In addition, sensors having high precisions and less degradation over time are expensive.

According to one aspect, the present invention aims to provide a display device and a display method which can obtain information concerning the color temperature of a light source while suppressing influence of degradation of sensors and detection precision.

Solution to Problem

One aspect of the present invention proposes the following matters.

One aspect of the present invention proposes a display device including: a display panel; a driver configured to drive the display panel based on a video signal; a detector configured to obtain a first detection value by detecting reflective light from reflective media, which occurs when ambient light is irradiated to reflective media, while obtaining a second detection value by detecting reflective light from reflective media, which occurs when the display panel irradiates its display light to reflective media; and an acquisition part configured to acquire information concerning the color temperature of ambient light based on the corrected drive value when the driver corrects the drive value for the display panel such that the second detection value approaches the first detection value or such that the chromaticity represented by the second detection value approaches the chromaticity represented by the first detection value.

One aspect of the present invention proposes an acquisition method including: a driving step for driving a display panel based on a video signal; a detecting step for acquiring a first detection value by detecting reflective light from reflective media, which occurs when ambient light is irradiated to reflective media, while acquiring a second detection value by detecting reflective light from reflective media, which occurs when the display panel irradiates its display light to reflective media; and an acquiring step for acquiring information concerning the color temperature of ambient light based on the corrected drive value when the drive value for the display panel is corrected such that the second detection value approaches the first detection value or such that the chromaticity represented by the second detection value approaches the chromaticity represented by the first detection value.

Advantageous Effects of Invention

According to one aspect, the present invention is able to obtain information concerning the color temperature of a light source while suppressing influence of degradation of sensors and detection precision.

DESCRIPTION OF EMBODIMENTS

Hereinafter, the embodiments of the present invention will be descried with reference to the drawings.

In the embodiments of the present invention, constituent elements can be appropriately replaced with existing constituent elements, and therefore it is possible to provide variations including combinations with other existing constituent elements. Therefore, the following descriptions concerning the embodiments of the present invention may not necessarily limit the scope of the invention as defined in claims.

Figure 1:
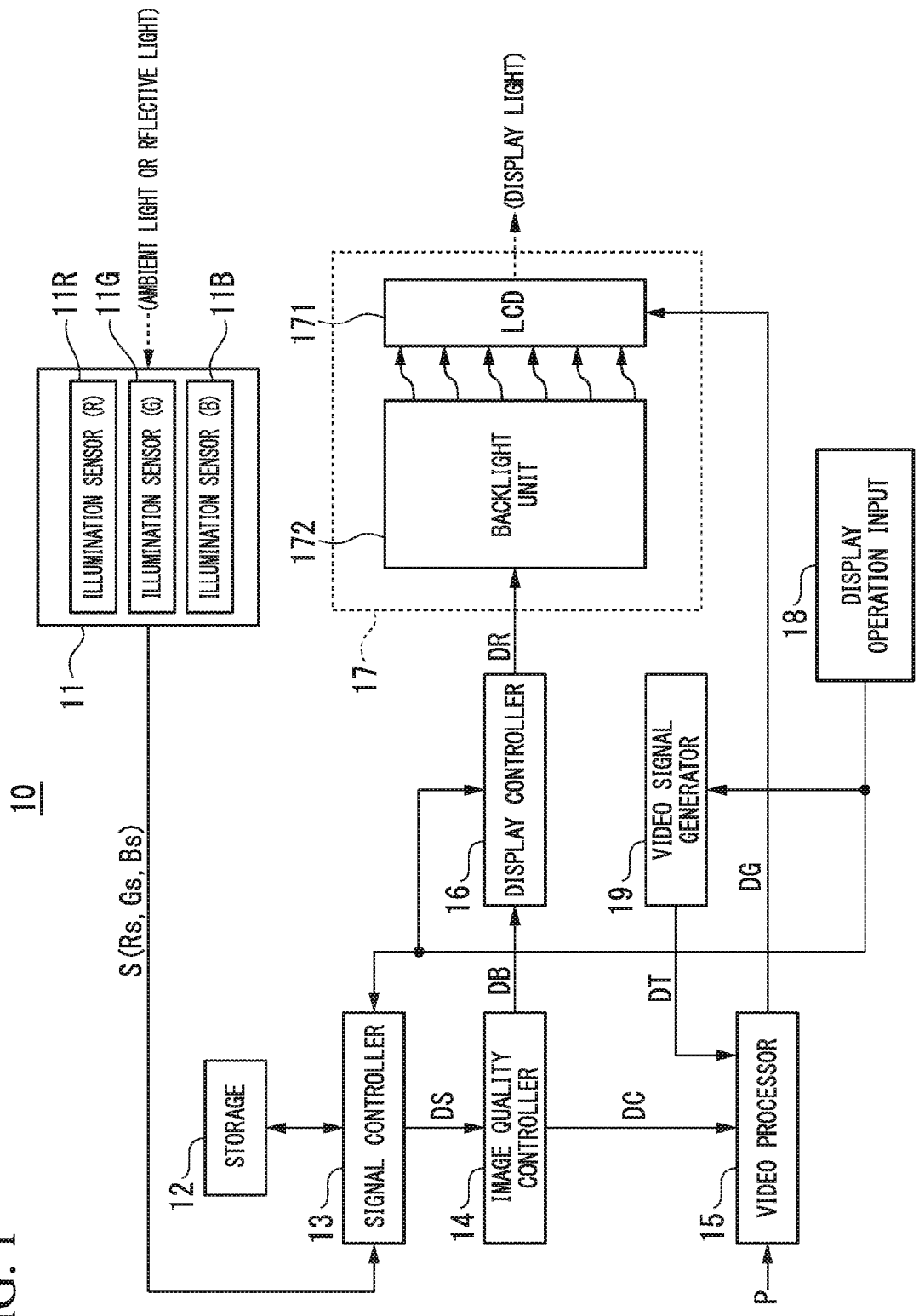
FIG. 1 is a block diagram showing an example of a configuration of a display device according to one embodiment of the present invention.

FIG. 1 is a block diagram showing an example of a configuration of a display device 10 according to one embodiment of the present invention.

The display device 10 is designed to display images (or videos) based on video signals P input thereto, and therefore the display device 10 has a function as a print emulator for reproducing tints of images printed on print media (i.e. images on printing materials) on the display screen thereof. The display device 10 includes a sensor unit 11, a storage unit 12, a signal controller 13, an image quality controller 14, a vide processor 15, a display controller 16, a display panel 17, a display operation input part 18, and a video signal generator 19. The display panel 17 includes a liquid crystal display (LCD) 171 and a backlight unit 172.

For example, the present embodiment refers to printing papers as print media. In this connection, print media could be any media made of arbitrary materials, which are not necessarily limited to printing papers, as long as print media allow arbitrary visual elements such as images and characters to be formed thereon. Therefore, the display device 10 of the present embodiment may function as an emulator for reproducing arbitrary visual elements on arbitrary media, which are not necessarily limited to printing papers.

Considering that the display device 10 can function as an emulator as described above, print media should be regarded as any media having light reflecting property (hereinafter, referred to as reflective media); hence, the term of print media could be rephrased as the term of reflective media.

For example, the sensor unit 11 is a color sensor adapted to RGB display colors, wherein the sensor unit 11 includes an illumination sensor 11R for detecting illumination of a red component (R) of incident light, an illumination sensor 11G for detecting illumination of a green component (G), and an illumination sensor 11B for detecting illumination of a green component (B). The sensor unit 11 outputs an illumination signal S(R, G, B) representing illumination intensities of color components of incident light. In the present embodiment, for example, the incident light of the sensor unit 11 is ambient light from a light source (not shown) or reflective light from the surface of print media.

As discussed later in conjunction with FIG. 4, the sensor unit 11 is attached to the lower side in the periphery of the display panel 17. However, this is not a restriction; hence, the sensor unit 11 can be located at an arbitrary position as long as the sensor unit 11 can produce first and second detection values, which will be described later. For example, the sensor unit 11 can be attached to the upper side in the periphery of the display panel 17. Alternatively, the sensor unit 11 can be attached to either the right side or the left side in the periphery of the display panel 17. In addition, the sensor unit 11 can be attached to a corner in the periphery of the display panel 17.

The storage unit 12 is a memory device for temporarily storing various types of data. In the present embodiment, for example, the storage unit 12 stores illumination intensities detected by the sensor unit 11.

The signal controller 13 is an element configured to carry out a writing control for writing illumination intensities, represented by an illumination signal S(R, G, B) output from the sensor unit 11, and a reading control for reading illumination intensities stored on the storage unit 12. The signal controller 13 carries out the writing control or the reading control for writing or reading illumination intensities with the storage unit 12 according to an instruction from the display operation input part 18, which will be described later. The signal controller 13 reads an illumination intensity DS from the storage unit 12 so as to supply it to the image quality controller 14.

In the present embodiment, a combination of the sensor unit 11, the storage unit 12, and the signal controller 13 forms a detector that detects the illumination of incident light so as to obtain an illumination intensity DS representing the illumination as a first detection value (e.g. reference characteristics discussed later) or a second detection value (e.g. an observation value discussed later). In the present embodiment, the above detector obtains a first detection value representing an illumination intensity detected by the sensor unit 11 that detects reflective light from print media, which occurs when an unillustrated light source irradiates ambient light to print media (or reflective media), in the display state of the display panel 17 displaying black color. As described later, the first detection value serves as the reference to adjust white points on the display panel 17 to white points on the print media 500. Hereinafter, the first detection value will be referred to as "reference characteristics".

In addition, the above detector obtains a second detection value representing an illumination intensity detected by the sensor unit 11 that detects reflective light from print media, which occurs when the display panel 17 irradiates its display light to print media, in the display state of the display panel 17 displaying white color. In this case, for example, the above print media is maintained in the confrontation state against the surface of the display panel 17. As described above, the second detection value is a detection value of the sensor unit 11, which is observed in the process of adjusting white points on the display panel 17 to white points on print media. Hereinafter, the second detection value will be referred to as "an observation value". The signal controller 13 sends the illumination intensity DS, such as reference characteristics and observation values, to the image quality controller 14.

The image quality controller 14 is an element serving as an acquisition part that acquires information concerning the color temperature of a light source from the illumination intensity DS (i.e. reference characteristics, observation values) of the signal controller 13 input thereto. In the present embodiment assuming that a light source emits light as ambient light, the color temperature of a light source indicates the color temperature of the ambient light from a light source. The image quality controller 14 produces an image quality control value DS for controlling color space in the process of acquiring information concerning the color temperature of a light source. In addition, the image quality controller 14 may serve as a correction part that corrects the color space of the display panel 17, which occurs at the predetermined reference color temperature specified by ICC profiles used in the video processor 15, to the color space at the color temperature of ambient light from a light source based on the information concerning the color temperature of ambient light from a light source. The image quality control value DC is supplied to the video processor 15 and thereby reflected in a gradation drive value DG for controlling the gradation of the liquid crystal display 171. As described later, the image quality controller 14 corrects the image quality control value DC such that the chromaticity represented by the observation value will match the chromaticity represented by reference characteristics, and therefore it obtains information concerning the color temperature of ambient light from a light source based on the corrected image quality control value DC.

The video processor 15 is an element serving as a driver that drives the liquid crystal display 171 of the display panel 17 based on a video signal P. The video processor 15 decodes the video signal P so as to produce the gradation drive value DG for driving the liquid crystal display 171. In this process, the video processor 15 carries out a color correction for the video signal P input thereto based on color correction information that is produced based on the information concerning the color temperature of ambient light.

The display controller 16 is an element that controls the luminance emitted by the backlight unit 172. When the display operation input part 18 provides an instruction concerning the setting of luminance with the signal controller 13 based on an observer's command, the display controller 16 sends a luminance drive value DR for controlling the luminance of emission based on a luminance setting value DB produced by the image quality controller 14. The luminance emitted by the backlight unit 172 can be arbitrarily set by way of an observer's operation.

The backlight unit 172 of the display panel 17 is an element that irradiates light to the back of the liquid crystal display 171, for example, wherein LEDs (Light Emitting Diodes) can be used for the backlight unit 172. The liquid crystal display 171 of the display panel 17 is an element that controls gradation of images formed on the display panel 17 by adjusting transmission of irradiated light of the backlight unit 172 in response to the gradation drive value DG.

The display operation input part 18 is an element that receives various operations by an observer. For example, the display operation input part 18 receives an observer's command for detecting reference characteristics and an observation value described above. In addition, the display operation input part 18 receives from an observer a setting value concerning the luminance emitted by the backlight unit 172. Moreover, the display operation input part 18 receives from an observer various types of information to be displayed on screen according to video signals produced by the video signal generator 19, which will be discussed later.

The video signal generator 19 is an element that generates a video signal DT representing various types of information received by the display operation input part 18. The video signal generator 19 supplies the video signal DT to the video processor 15 so as to reflect the video signal DT in the gradation drive value DG. In the present embodiment, the video signal generator 19 is an arbitrary element, which can be omitted here.

Next, the operation of the display device 10 of the present embodiment will be described with reference to FIG. 2 through FIG. 6.

Figure 2:
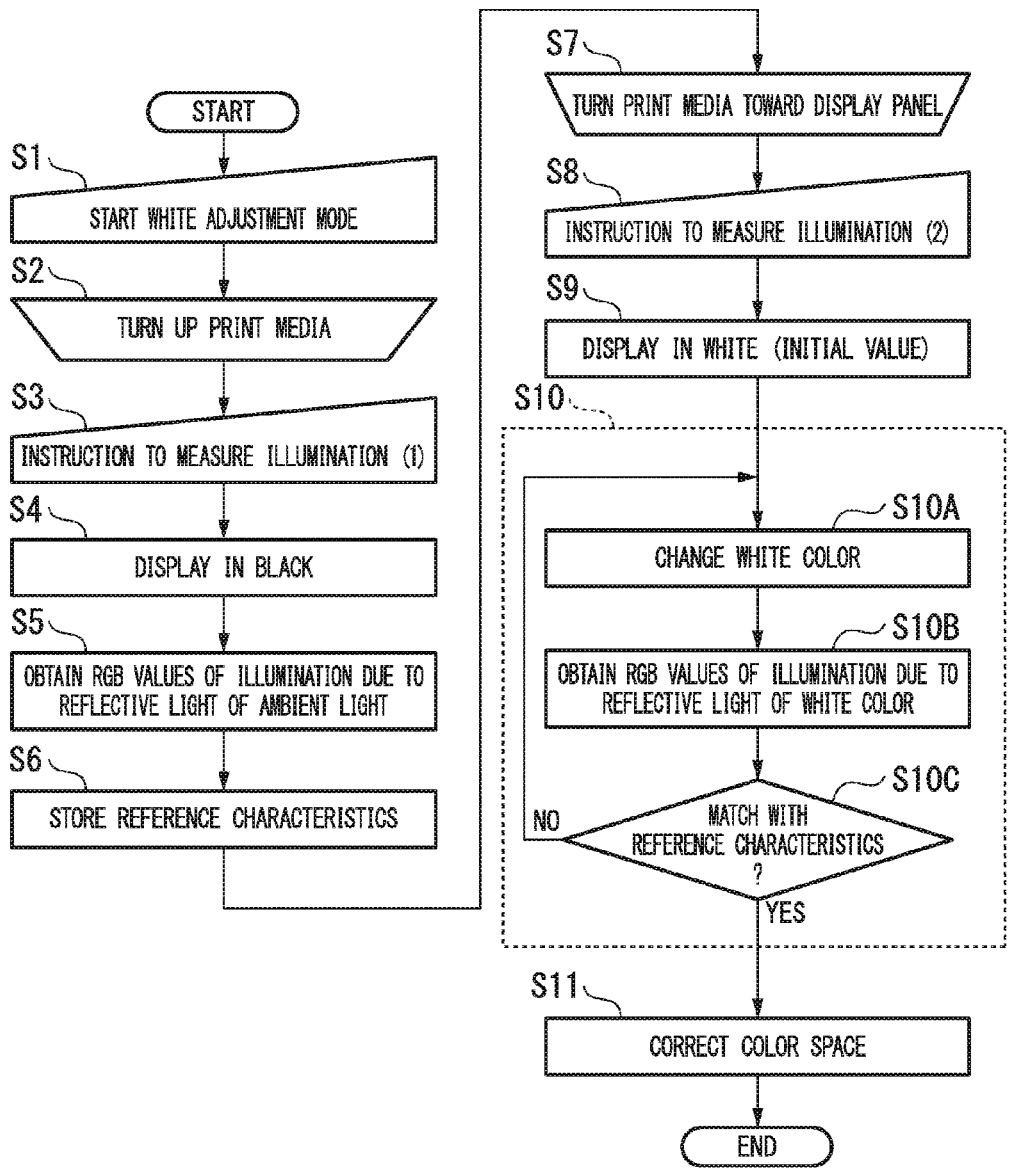
FIG. 2 is a flowchart showing an example of a flow of operation in the display device according to one embodiment of the present invention.
Figure 3:
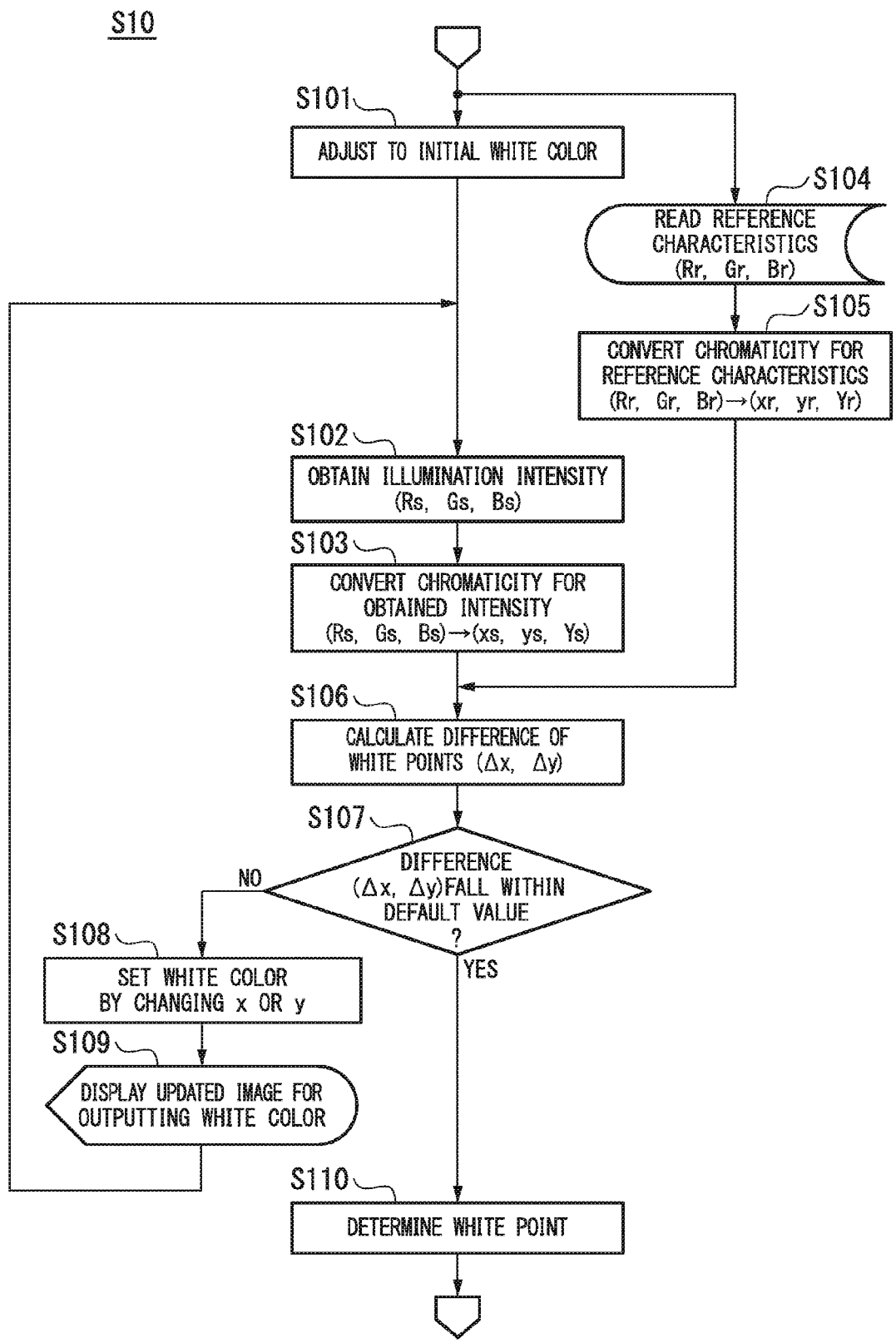
FIG. 3 is a flowchart showing an example of the detailed operation of the display device according to one embodiment of the present invention.
Figure 5A:
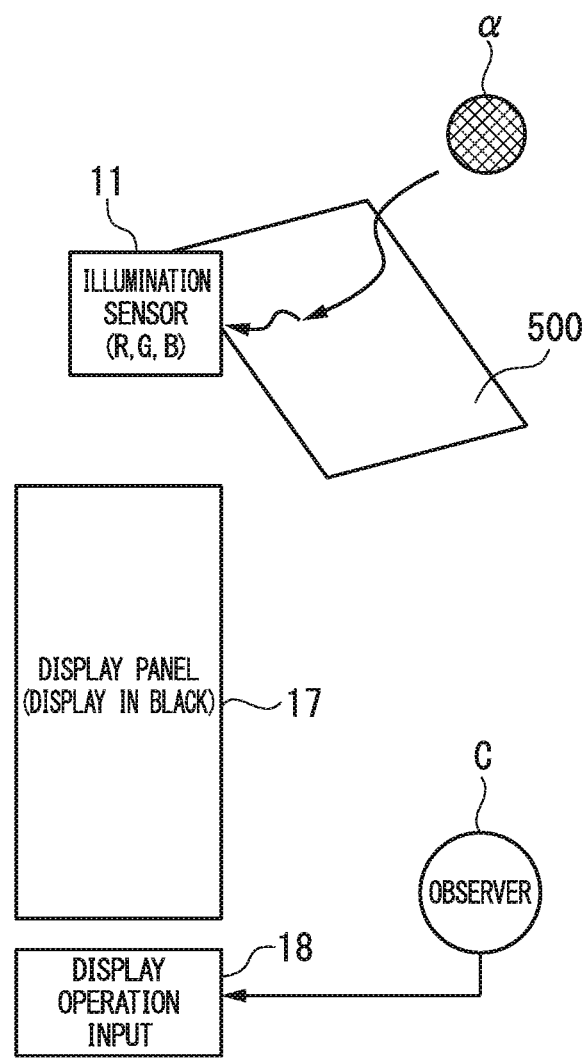
FIG. 5A is a schematic diagram for supplementary explanation of the operation of the display device according to one embodiment of the present invention, i.e. a diagram used to explain a method for detecting illumination representing white points on print media when a light source irradiates ambient light to the surface of print media.
Figure 5B:
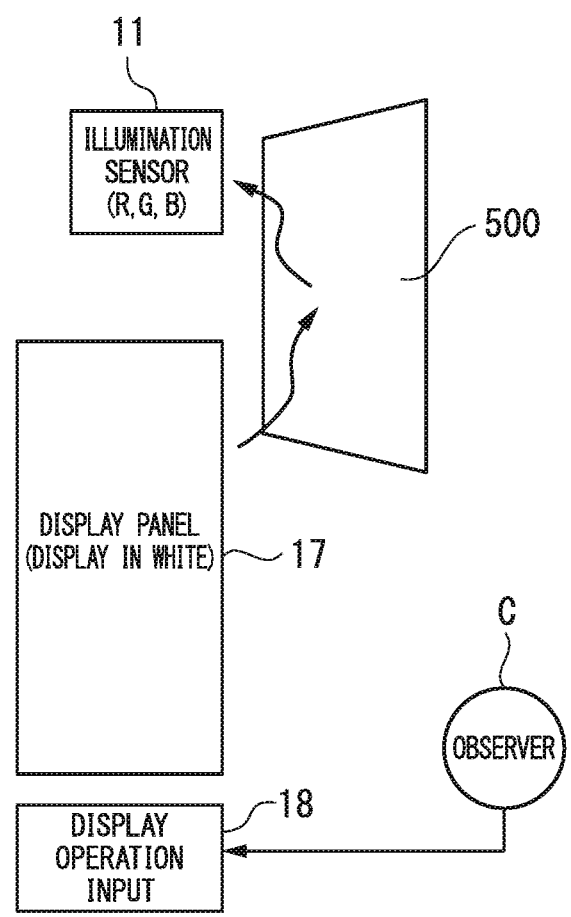
FIG. 5B is a schematic diagram for supplementary explanation of the operation of the display device according to one embodiment of the present invention, i.e. a diagram used to explain a method for detecting illumination representing white points on print media when a display panel irradiates display light (or white light) to print media.
Figure 6:
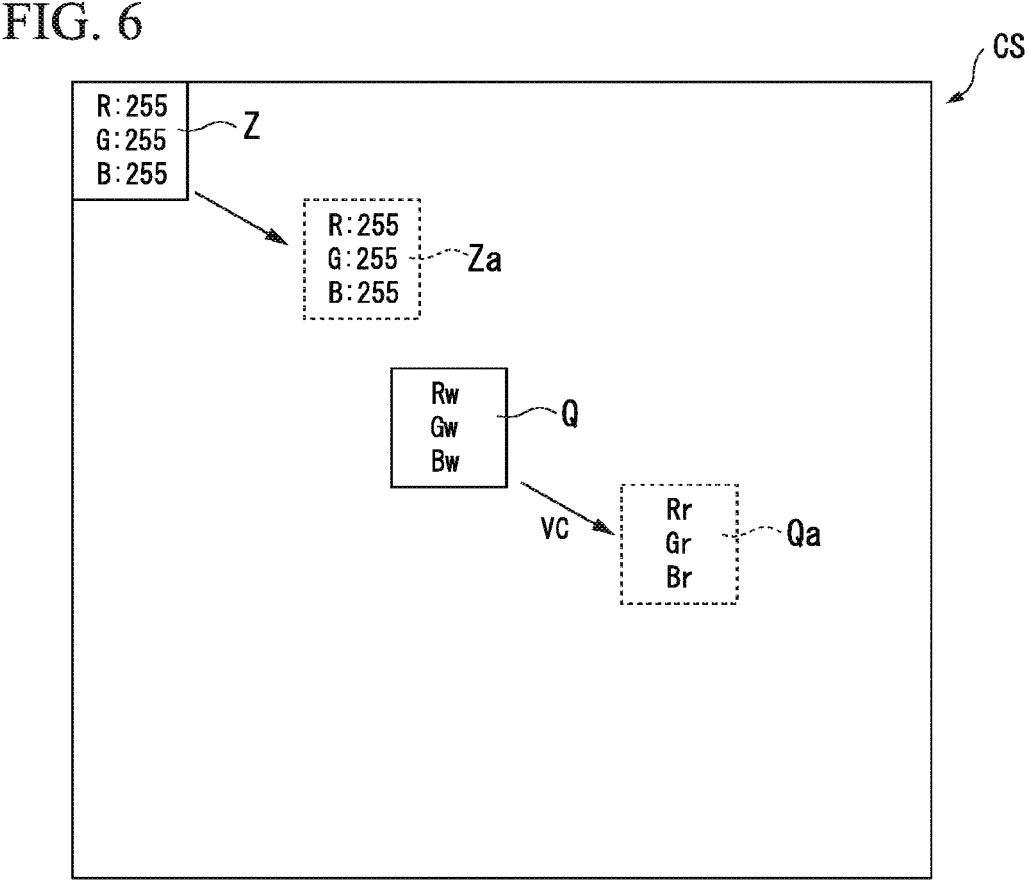
FIG. 6 is a diagram used to explain the concept of correcting color space implemented using the operation of the display device according one embodiment of the present invention.

FIG. 2 is a flowchart showing an example of a flow of operation of the display device 10 according to the present embodiment of the present invention. FIG. 3 is a flowchart showing an example of the detailed operation of the display device 10 according to the present embodiment of the present invention. FIG. 4 is a schematic diagram for supplementary explanation of the operation of the display device according to the present embodiment of the present invention, i.e. a diagram used to explain a method for setting the print media 500. FIG. 5A is a schematic diagram for supplementary explanation of the operation of the display device 10 according to the present embodiment of the present invention, i.e. a diagram used to explain a method for detecting illumination of white points on the print media 500 when a light source α irradiates ambient light to the surface of the print media 500. FIG. 5B is a schematic diagram used to explain a method for detecting illumination of white points on the print media 500 when the display panel 17 irradiates its display light (i.e. white-color light) to the print media 500. FIG. 6 is a diagram used to explain the concept of correcting color spaces implemented by way of the operation of the display device according to the present embodiment of the present invention.

The display device 10 of the present embodiment implements a fundamental operation for displaying images on the display panel 17 based on the video signal P, wherein the display device 10 further implements the operation of a print emulator that adjusts tints of images displayed on the display panel 17 to tints of images printed on print media according to an observer's operation. Briefly speaking, the display device 10 implements the operation of a print emulator that adjusts white points on the display panel 17 to white points on print media so as to obtain information concerning the color temperature of a light source and thereby correct the color space of the display panel 17 based on the information concerning the color temperature of a light source. When correcting color spaces, the display device 10 recalculates color spaces by shifting color spaces specified by ICC profiles based on differences between white points, represented by the color temperature of a light source, and white points specified by ICC profiles.

Hereinafter, the operation of the display device 10 will be described in detail by paying attention to the operation of a print emulator.

First, an observer (or a user) who uses the display device 10 as a print emulator prepares print media for printing images reproduced by a print emulator. It is preferable that print media have less gloss and disused reflection. That is, it is preferable that print media should be stable in terms of luminance of reflective light. However, this is not a limitation; hence, it is possible to use arbitrary papers as print media.

To activate the display device 10 as a print emulator, an observer should set the operation mode of the display device 10 to "White Adjustment Mode" by use of the display operation input part 18. Thus, it is possible to start the white adjustment mode (step S1).

Figure 4:
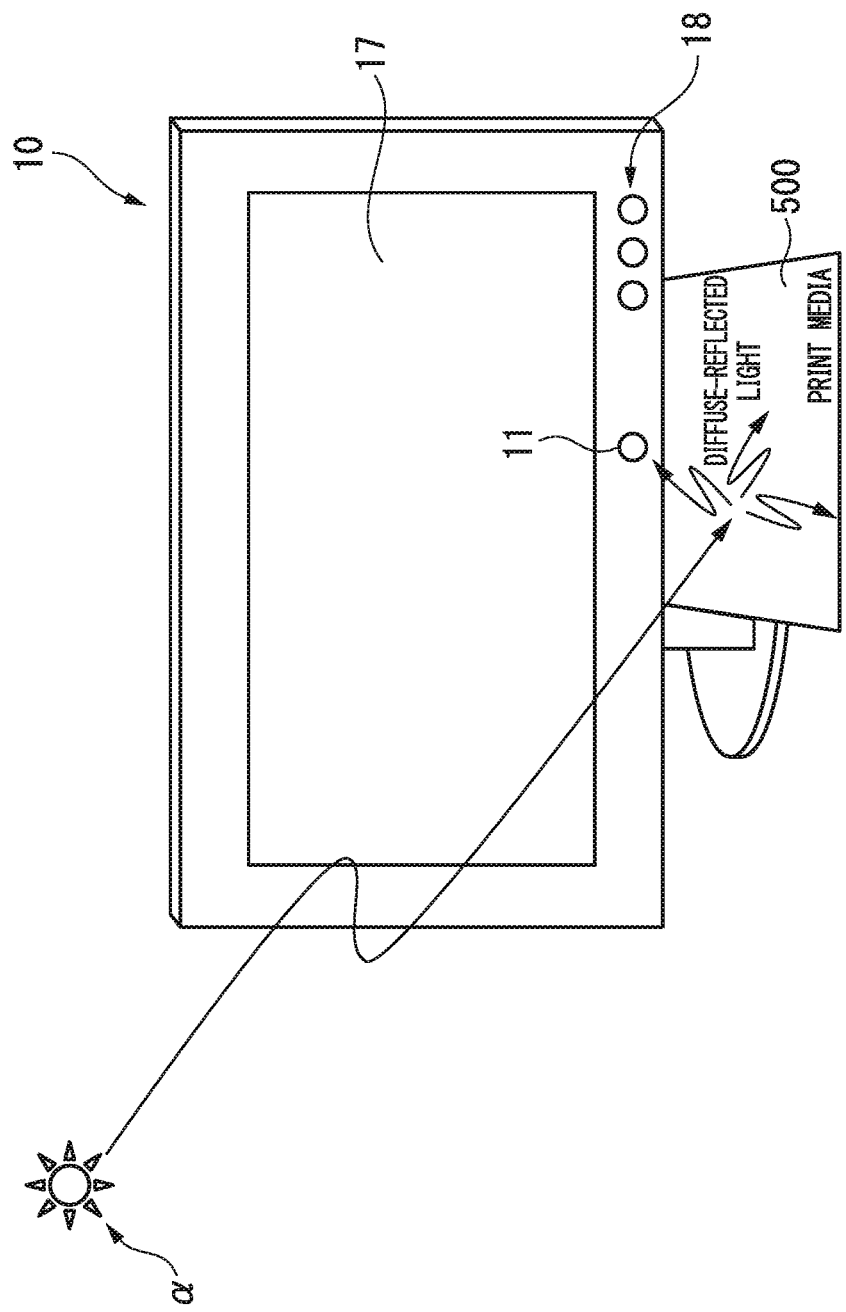
FIG. 4 is a schematic diagram for supplementary explanation of the detailed operation of the display device according to one embodiment of the present invention, i.e. a diagram used to explain a setting method of print media.

Subsequently, as shown in FIG. 4, an observer turns up the printing face of print media 50 such that a light source α irradiates ambient light to the surface (or the printing face) of the print media 500 prepared in advance and then places the print media 500 horizontally at a position beneath the sensor unit 11 (step S2). In this case, print media should be located in proximity to the sensor unit 11 such that ambient light from the light source α is reflected at the surface to cause reflective light to be input to the sensor unit 11.

Then, an observer operates the display operation input part 18 so as to give an illumination acquiring instruction (1) to the display device 10, thus indicating the sensor unit 11 to acquire (or detect) an illumination intensity of reflective light from the print media 500 (step S3). Upon receiving the illumination acquiring instruction (1), as shown in FIG. 5A, the signal controller 13 produces an illumination intensity DS causing a black display state of the display panel 17 (step S4). Alternatively, upon receiving the illumination acquiring instruction (1), the display controller 16 turns off the backlight unit 172 so as to cause a black display state of the display panel 17. In the black display state of the display panel 17, the sensor unit 11 detects an illumination intensity for each color component in reflective light from the print media 500 so as to send an illumination signal S(R, G, B) representing the illumination intensity to the signal controller 13.

The signal controller 13 reads an illumination intensity (R, G, B) represented by the illumination signal S(R, G, B) input thereto from the sensor unit 11 in the black display state of the display panel 17, thus obtaining the illumination intensity (R, G, B) as reference characteristics (Rr, Gr, Br) (step S5). Then, the signal controller 13 stores the reference characteristics (Rr, Gr, Br) on the storage unit 12 (step S6). As described above, the sensor unit 11 detects reflective light of the print media 500 which occurs when the light source α irradiates ambient light to the print media 500, and therefore the signal controller 13 obtains the illumination intensity as reference characteristics (Rr, Gr, Br) so as to store them on the storage unit 12.

Subsequently, as shown in FIG. 5B, an observer turns up the printing face of the print media 500 towards the surface of the display panel 17 such that the display panel 17 irradiates its display light to the printing face of the print media 500 so as to cause reflective light of the print media 500 to be input to the sensor unit 11, thus maintaining the confrontation state between the surface of the display panel 17 and the printing face of the print media 500 (step S7).

Subsequently, an observer operates the display operation input part 18 to give an illumination acquiring instruction (2) to the display device 10, indicating the sensor unit 11 to acquire (or detect) an illumination intensity of reflective light from the print media 500 (step S8). Upon receiving the illumination acquiring instruction (2), as shown in FIG. 5B, the signal controller 13 produces an initial value of an illumination intensity DS causing a white display state of the display panel 17 (step S9). This causes the display panel 17 to emit white light. The sensor unit 11 detects reflective light from the print media 500 which occurs when the display panel 17 irradiates its display light (or white light) to the print media 500 that is held to confront the surface of the display panel 17, thus sending an illumination signal S(R, G, B) representing the illumination intensity to the signal controller 13.

The signal controller 13 reads an illumination intensity from an illumination signal S(R, G, B) of the sensor unit 11 so as to acquire an observation value (Rs, Gs, Bs). Thus, the sensor unit 11 detects reflective light from the print media 500, which occurs when the display panel 17 irradiates its display light (or white light) to the print media 500, based on an initial value of an illumination intensity DS produced by the signal controller 13. Then, the signal controller 13 obtains an illumination intensity (R, G, B) for each color component detected by the sensor unit 11 as an observation value (Rs, Gs, Bs). The observation value (Rs, Gs, Bs) represents the chromaticity of reflective light from the print media 500 reflecting ambient light from the light source α, i.e. white points on the print media 500 under the ambient light.

Subsequently, as described in detail below, the image quality controller 14 acquires information concerning the color temperature of a light source by adjusting white points on the display panel 17 to white points on print media based on the reference characteristics (Rr, Gr, Br) and the observation value (Rs, Gr, Bs) (step S10). In the present embodiment, the image quality controller 14 corrects an image quality control value DC serving as a drive value for the display panel 17 such that the observation value (Rs, Gs, Bs) acquired by the signal controller 13 will approach the reference characteristics (Rr, Gr, Br) or such that the chromaticity (or white points) represented by the observation value will approach the chromaticity (or white points) represented by the reference characteristics.

Thus, it is possible to obtain information concerning the color temperature of ambient light of the light source α from an image quality control value DC that is given when a difference between the chromaticity of the reference characteristics (Rr, Gr, Br) and the chromaticity of the observation value (Rs, Gs, Bs) falls within a default value. It is possible to arbitrary set the default value within a range of values in which an observer may visually recognize that the chromaticity of the reference characteristics would be identical to the chromaticity of the observation value. The present embodiment is designed such that the image control value DC is reflected in the gradation drive value DG of the video processor 15, in other words, the image quality controller 14 is able to correct the gradation drive value DG such that the chromaticity represented by the observation value, which is obtained by the signal controller 13, would be identical to the chromaticity represented by the reference characteristics.

Specifically, the image quality controller 14 changes an image quality control value DC reflected in a gradation drive value DG representing white color on the display panel 17 in the process of correcting the image control value DC (step S10A). After changing the image quality control value DG, the image quality controller 14 acquires the illumination intensity (R, G, B) detected by the sensor unit 11 as the observation value (Rs, Gs, Bs) (step S10B). Then, the image quality controller 14 compares the reference characteristics (Rr, Gr, Br) with the observation value (Rs, Gs, Bs) so as to determine whether or not the observation value matches the reference characteristics (step S10C).

When the comparison result indicates that the observation value does not match the reference characteristics (step S10C: NO), i.e. when a difference between the observation value and the reference characteristics does not fall within a default value, the processing returns to step S10A so as to repeat the above steps until the observation value matches the reference characteristics. When the observation value matches the reference characteristics (step S10C: YES), i.e. when a difference between the observation value and the reference characteristics fall within a default value, the observation value indicates the chromaticity represented by the reference characteristics, and therefore the image quality controller 14 acquires the image quality control value DC (or the gradation drive value DG) corresponding to the observation value as information concerning the color temperature of the light source cc.

The method how to acquire the information concerning the color temperature of the light source α in the aforementioned step S10 (i.e. S10A through S10C) will be described in further detail with reference to FIG. 3.

After obtaining the reference characteristics (Rr, Gr, Br) in the foregoing steps S2 through S9, the image quality controller 14 adjusts the image control value DC so as to set the display state of the display panel 17 to the white display state corresponding to an initial value (step S101). The signal controller 13 obtains the observation value (Rs, Gs, Bs) of the sensor unit 11 in the white display state of the display panel 17 corresponding to the initial value (step S102). In this case, the signal controller 13 needs to expand the observation value (Rs, Gs, Bs) into color coordinates; hence, for example, the signal controller 13 converts the observation value (Rs, Gs, Bs) in the RGB color system into a value (xs, ys, Ys) in a CIE color system.

Thus, the image quality controller 14 corrects the image quality control value DC such that the chromaticity represented by the value (xs, ys, Ys) of the CIE color system, corresponding to the observation value obtained by the signal controller 13, will match the chromaticity represented by the value (xr, ys, Yr) of the CIE color system corresponding to the reference characteristics. That is, the image quality controller 14 calculates a difference ($\Delta x$, $\Delta y$) between a white point, represented by the value (xs, ys) of the CIE color system, and a white point represented by the reference characteristics (xr, yr), and therefore the image quality controller 14 changes the image control value DC such that the difference ($\Delta x$, $\Delta y$) will become equal to or below a default value determined in advance.

Specifically, the image quality controller 14 determines whether or not the difference ($\Delta x$, $\Delta y$) between a white point represented by the value (xs, ys) of the CIE color system and a white point represented by coordinates (xr, yr) of the CIE color system corresponding to the reference characteristics falls within a default value (step S107). When the difference ($\Delta x$, $\Delta y$) does not fall within the default value (step S107: NO), the image quality controller 14 resets the white point by changing the value (x, y) represented by the image quality control value DC (step S108), thus producing the image quality control value DC corresponding to the white point being reset. The video processor 15 sends the gradation drive value DG, representing the chromaticity corresponding to the image control value DC, to the liquid crystal display 171. Thus, it is possible to update an image in the white display state of the display panel 17 (step S109).

Thereafter, the processing returns to step S102, and therefore the foregoing steps will be repeated until the difference ($\Delta x$, $\Delta y$) falls within the default value. When the difference ($\Delta x$, $\Delta y$) falls within the default value (step S107: YES), the image quality controller 14 defines the white point on the display panel (S110), and therefore it acquires the current image quality control value DC (or the gradation drive value DG) as the information concerning the color temperature of the light source α.

The aforementioned example is designed to convert the reference characteristics and the observation value from the RGB color system to the CIE color system in the process of specifying the color temperature of a light source so as to calculate the difference ($\Delta x$, $\Delta y$); however, it is possible to calculates a difference between the reference characteristics and the observation value in an arbitrary color system. For example, it is possible to calculate a difference between the reference characteristics of the RGB color system and the observation value of the RGB color system so as to set the image quality control value DC (or the gradation drive value DG) such that a difference between them will fall within a default value. In this case, it is possible to set the image quality control value DC (or the gradation drive value DG) such that the "ratio", instead of the "difference", between the reference characteristics and the observation value will become "1". For example, "Rr/Br" and "Gr/Br" are calculated based on the reference characteristics (Rr, Gr, Br) while "Rs/Bs" and "Gs/Bs" are calculated based on the observation value (Rs, Gs, Bs). Thus, it is possible to set the image quality control value DC (or the gradation drive value DC) such that (Rr/Br)/(Rs/Bs) becomes "1" while (Gr/Br)/(Gs/Bs) becomes "1". By using the "ratio" in the RGB color system, it is possible to reduce the influence of luminance involved in each color component, and therefore it is possible to accurately detect a white point (or chromaticity).

Upon acquiring the information concerning the color temperature of the light source α as described above, the video processor 15 carries out color correction for the video signal P input thereto based on the acquired information concerning the color temperature of ambient light from the light source α, and therefore it corrects the color space of the display panel 17 at the predetermined reference color temperature (e.g. 5,000 K) specified by ICC profiles to the color space at the color temperature of the light source α (step S11). In the present embodiment, the video processor 15 recalculates the color space of the display panel 17 based on the aforementioned difference ($\Delta x$, $\Delta y$). Thus, the video processor 15 drives the display panel 17 based on a video signal subjected to color correction.

Next, the concept for correcting color spaces will be described with reference to FIG. 6.

FIG. 6 is a diagram used to explain the concept for correcting color spaces implemented by the operation of the display device 10 according to the present embodiment of the present invention. For example, FIG. 6 diagrammatically shows a color space CS representing a color space before correction specified by ICC profiles. The color space CS includes gradation values (R, G, B) in the RGB color system, wherein each gradation value (R, G, B) corresponds to a gradation drive value DG. Those gradation values (R, G, B) in the RGB color system are defined in the entirety of the color space CS.

In the example of FIG. 6, a gradation value (255, 255, 255) is defined in an area Z of the color space CS. Therefore, when a video signal P representing the gradation value (255, 255, 255) is input to the video processor 15, for example, the video processor 15 supplies a gradation drive value DG corresponding to the area Z, defining the gradation value (255, 255, 255), to the liquid crystal display 171 of the display panel 17.

It is possible to detect a white point (or chromaticity) of the color space CS corresponding to the color temperature of the light source α based on the information concerning the color temperature of the light source α. That is, the white point of the color space corresponding to the color temperature of the light source α matches the position of the color space represented by the observation value (Rs, Gs, Bs), which is observed when acquiring the information concerning the color temperature of the light source α, according to ICC profiles. In the example of FIG. 6, an area Qa defining a gradation value, corresponding to the reference characteristics (Rr, Gr, Br) obtained as the observation value, indicates a white point corresponding to the color temperature of the light source α. The image quality controller 14 recalculates the correlation between the gradation value (R, G, B) and the gradation drive value DG in the entirety of the color space CS such that a gradation value of the area Qa, represented by the gradation value corresponding to the reference characteristics (Rr, Gr, Br), will be set to a white point, thus changing the allocation of the gradation value (R, G, B) in the color space CS.

Specifically, the image quality controller 14 corrects (or converts) the color space CS based on a direction component and a distance component of a vector VC lying between a start point serving as an area Q, represented by a value (Rw, Gw, Bw) indicating a white point before correction, and an end point serving as the area Qa, represented by the value (Rr, Gr, Br) indicating a white point after correction. Thus, it is possible to form a color space having a white point corresponding to the area Qa specified by an observation value (Rs, Gs, Bs) representing the color temperature of the light source α. After correction of the color space, for example, a gradation value (255, 255, 255) is moved from the area Z to an area Za. Therefore, when the video signal P representing the gradation value (255, 255, 255) is input to the video processor 15, the video processor 15 supplies the gradation drive value DG corresponding to the area Za to the liquid crystal display 171 of the display panel 17.

In this connection, the aforementioned example is not restrictive: hence, it is possible to realize the correction (or conversion) of color spaces by way of an arbitrary method.

Due to the aforementioned correction of the color space, the white point of the display panel 17 becomes identical to the white point represented by the observation value (Rs, Gs, Bs) representing the color temperature of the light source α. Herein, the white point represented by the observation value (Rs, Gs, Bs) representing the color temperature of the light source α matches the white point corresponding to the reference characteristics. The white point corresponding to the reference characteristics indicates the white point of the print media 500. Therefore, the white point on the display screen of the display panel 17 after correction of the color space will match the white point of the print media 500, and therefore the white point of the display panel 17 matches the white point of the print media 500. Due to matching between white points, tints of images displayed on the display panel 17 match tints of images printed on the print media 500. In this stage, however, the luminance of images displayed on the display panel 17 does not necessarily match the luminance of images printed on the print media 500.

To match the luminance of images displayed on the display panel 17 with the luminance of images printed on the print media 500, an observer should establish an original observed state by placing the print media 500 under observation light so as to operate the display operation input part 17 while visually comparing the white-color luminance of print media with the white-color luminance of the display panel 17, thus inputting a command for adjusting the luminance of the display panel 17. The display controller 16 produces a luminance drive value DR responsive to an observer's command so as to adjust the luminance of the backlight unit 172. Thus, it is possible to solely adjust the luminance while maintaining tints of images on the display panel 17. As a result, an observer may observes the print media 500 and the display panel 17 under ambient light such that the print media 500 would visually match the display panel 17 in terms of their white colors and luminance.

Instead of adjusting the luminance of the backlight unit 172, it is possible to control the gradation of the liquid crystal display 171 to stabilize chromaticity components (x, y) in the CIE color system, and therefore it is possible to obtain the same effect as the effect obtained by adjusting luminance.

According to the present embodiment, the sensor unit 11 obtains reference characteristics and observation values in the process of acquiring the information concerning the color temperature of the light source α, and then it acquires the information concerning the color temperature of a light source using their relative values (i.e. differences). For this reason, it is possible to cancel out influences of degradation and a reduction of detection precision irrespective of degradation of the sensor unit 11 and a reduction of the detection precision of the sensor unit 11 in the process of acquiring relative values (or differences) between reference characteristics and observation values. Even when an error occurs between a true value and a detected value of the sensor unit 11 due to its degradation, for example, the error should be included in both the reference characteristics and the observation values. Therefore, it is possible to cancel out errors of observation values with errors of reference characteristics by calculating differences between observation values and reference characteristics, and therefore it is possible to theoretically eliminate the influence of errors. Owing to one-to-one correspondence between the input and the output of the sensor unit 11, it is possible to reduce influence of degradation of the sensor unit 11 irrespective of the type of correspondence. Therefore, it is possible to accurately detect the color temperature of a light source.

The present embodiment is able to detect color temperatures for any types of unknown light sources since it uses the actual ambient light and print media. In addition, it is possible to reduce influence of reflection of light in the periphery of the sensor unit 11 by moving print media close to the sensor unit 11.

Moreover, the present embodiment is able to adjust the white color of the print media to the white color of the display panel 17 without using light sources and print media defined by profiles of printers and without using measuring instruments specially designed to measure color temperatures. Therefore, it is possible for users to easily confirm finished conditions before printing on a monitor, and therefore it is possible for users to suppress consumption of print media and ink due to a failure of printing.

The present embodiment uses the CIE color system (x, y, Y) in the process of adjusting white points under observation light to white points represented by reference characteristics (step S10), and therefore it is possible to accurately adjust white points (or chromaticity) to ideal ones while preventing influences for luminance. Therefore, it is possible to accurately detect the color temperatures of light sources.

Next, another embodiment of the present invention will be described below.

Figure 7:
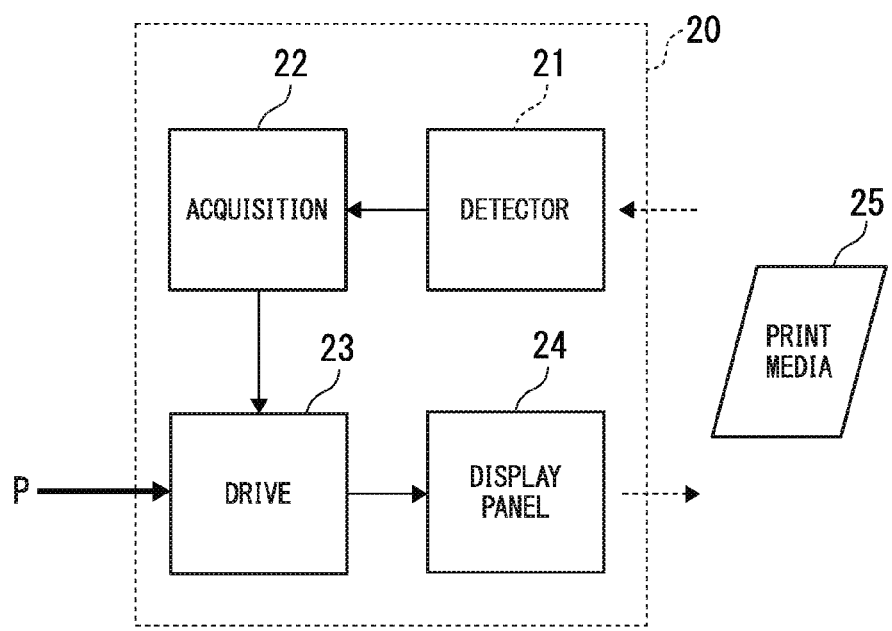
FIG. 7 is a block diagram showing an example of a configuration of a display device according to another embodiment of the present invention.

FIG. 7 is a block diagram showing an example of a configuration of a display device 20 according to another embodiment of the present invention.

The display device 20 includes a detector 21, an acquisition part 22, a driver 23, and a display panel 24.

The detector 21 detects reflective light from a print media 25 irradiated with ambient light of an unillustrated light source or reflective light from the print media 25 irradiated with display light of the display panel 24. The driver 23 drives the display panel 24 based on a video signal P. The detector 21 obtains a first detection value by detecting reflective light from the print media 25, which occurs when an unillustrated light source irradiates ambient light to the print media 25. In addition, the detector 21 obtains a second detection value by detecting reflective light from the print media 25, which occurs when the display panel 24 irradiates its display light to the print media 25. The driver 23 corrects a drive value for the display panel 24 such that the second detection value will approach the first detection value or such that the chromaticity represented by the second detection value will approaches the chromaticity represented by the first detection value, and therefore the acquisition part 22 acquires information concerning the color temperature of ambient light based on the corrected drive value.

The detector 21 corresponds to a combination of the sensor unit 11, the storage unit 12, and the signal controller 13 shown in FIG. 1. The acquisition part 22 corresponds to the image quality controller 14 shown in FIG. 1. The driver 23 corresponds to the video processor 15 shown in FIG. 1. The display panel 24 corresponds to the display panel 17 shown in FIG. 1.

According to the display device 20 of another embodiment shown in FIG. 7, it is possible to obtain the same effect as the effect of the display device 10 according to the first embodiment shown in FIG. 1.

The main effects of the foregoing embodiment will be summarized as follows.

(1) It is possible to detect the color temperature of ambient light from a light source while suppressing influence of degradation of sensors and detection precision.

(2) It is possible to realize a print emulator even when the color temperature of ambient light is unknown (i.e. the effect of claim 2). Therefore, it is possible to reproduce the chromaticity of images on print media under ambient light with a display panel.

(3) It is possible to produce a drive value for a display panel in correspondence with the color temperature of unknown ambient light.

(4) It is possible to detect reflective light from a printing face of print media, which is irradiated with the display light of a display panel, while suppressing influence of ambient light.

(5) It is possible to detect reflective light from a printing face of print media, which is irradiated with ambient light, without being exerted any influence of transmission light of print media.

(6) It is possible to stabilize the display light of the display panel 17 in luminance, and therefore it is possible to detect the color temperature of ambient light while suppressing influence of variations of luminance in display light.

The operation (or processing) of a display device according to the present embodiment can be expressed as a display method. In this case, it is possible to express the display method of the present invention as a display method including a step of driving a display panel based on a video signal; a step of acquiring reference characteristics by detecting reflective light from print media, which occurs when ambient light is irradiated to print media, and thereby acquiring an observation value by detecting reflective light from print media, which occurs when the display panel irradiates its display light to print media; and a step of correcting a drive value for driving the display panel such that the chromaticity represented by the observation value will match the chromaticity represented by the reference characteristics, and thereby acquiring information concerning the color temperature of ambient light from a light source based on the corrected drive value.

REFERENCE SIGNS LIST

10 . . . display device, 11 . . . detector sensor unit, 12 . . . storage unit, 13 . . . signal controller, 14 . . . image quality controller, 15 . . . video processor, 16 . . . display controller, 17 . . . display panel, 18 . . . display operation input part, 19 . . . video signal generator, 20 . . . display device, detector, 22 . . . acquisition part, 23 . . . driver, 24 . . . display panel, 25 . . . print media (reflective media), 171 . . . liquid crystal display (LCD), 172 . . . backlight unit, 500 . . . print media (reflective media), α . . . light source, C . . . observer, S1-S11, S101-S110, S10A-S10C . . . steps of processing.

The invention claimed is:

1. A display device comprising:
a display panel;
a driver configured to drive the display panel based on a video signal;
a detector configured to obtain a first detection value by detecting reflective light from a reflective media, which occurs when ambient light is irradiated to the reflective media, while obtaining a second detection value by detecting reflective light from the reflective media, which occurs when the display panel irradiates its display light to the reflective media; and
an acquisition part configured to acquire information concerning a color temperature of the ambient light based on a corrected drive value when the driver corrects the drive value for the display panel such that the second detection value approaches the first detection value or such that chromaticity represented by the second detection value approaches chromaticity represented by the first detection value.

2. The display device according to claim 1, wherein the detector detects the first detection value in a black display state of the display panel.

3. The display device according to claim 1, further comprising a video processor configured to carry out a color correction for the video signal input thereto based on color correction information produced based on the information concerning the color temperature of the ambient light.

4. The display device according to claim 1, wherein the acquisition part acquires the drive value providing the second detection value as the information concerning the color temperature of the ambient light when a difference between the first detection value and the second detection value falls within a default value.

5. The display device according to claim 1, wherein the detector is attached to a lower side of the display panel so as to detect the reflective light from the reflective media when the reflective media is held horizontally below the detector.

6. The display device according to claim 1, wherein the display panel is equipped with a backlight having an LED.

7. A color temperature acquisition method comprising:

a driving step for driving a display panel based on a video signal;

a detecting step for acquiring a first detection value by detecting reflective light from a reflective media, which occurs when ambient light is irradiated to the reflective media, while acquiring a second detection value by detecting reflective light from the reflective media, which occurs when the display panel irradiates its display light to the reflective media; and an acquiring step for acquiring information concerning a color temperature of the ambient light based on a corrected drive value when the drive value for the display panel is corrected such that the second detection value approaches the first detection value or such that chromaticity represented by the second detection value approaches chromaticity represented by the first detection value.

8. The color temperature acquisition method according to claim 7, wherein the detecting step detects the first detection value in a black display state of the display panel.

9. The color temperature acquisition method according to claim 7, wherein the acquiring step acquires the drive value providing the second detection value as the information concerning the color temperature of the ambient light when a difference between the first detection value and the second detection value falls within a default value.

10. The color temperature acquisition method according to claim 7, wherein the detecting step detects the first detection value when the reflective media is held horizontally below the display panel.

11. The color temperature acquisition method according to claim 7, wherein the detecting step detects the second detection value when the reflective media is held in confrontation with a display surface of the display panel.

12. A display method adapted to a display device using the color temperature acquisition method according to claim 7, the display method comprising the steps of:

carrying out a color correction for a video signal input thereto based on color correction information, which is produced based on the information concerning the color temperature of the ambient light acquired by the acquiring step; and driving the display panel based on the video signal subjected to the color correction.

\* \* \* \* \*